United States Patent [19]
Wickoren et al.

[11] Patent Number: 5,481,856
[45] Date of Patent: Jan. 9, 1996

[54] METHOD AND APPARATUS FOR CUTTING AQUATIC VEGETATION

[75] Inventors: Ricard J. Wickoren, Shawnee; Dean R. Wickoren, Paola, both of Kans.

[73] Assignee: Innovative Material Systems, Inc., Olathe, Kans.

[21] Appl. No.: 342,253

[22] Filed: Nov. 18, 1994

[51] Int. Cl.$^6$ .................................................. A01D 44/00
[52] U.S. Cl. ........................................ 56/9; 56/8; 56/251
[58] Field of Search ........................... 56/8, 9, 156, 251

[56] References Cited

U.S. PATENT DOCUMENTS

| | | | |
|---|---|---|---|
| 669,820 | 3/1901 | Christen . | |
| 1,028,671 | 6/1912 | Brooks . | |
| 1,795,003 | 3/1931 | Allen . | |
| 2,223,641 | 12/1940 | Sanger | 56/8 |
| 2,486,275 | 10/1949 | Grimwald | 56/8 |
| 2,635,406 | 4/1953 | Chauvin | 56/8 |
| 2,702,975 | 3/1955 | Friesen | 56/8 |
| 3,238,708 | 3/1966 | Zickefoose | 56/9 |
| 3,407,577 | 10/1968 | Fiske | 56/8 |
| 3,468,106 | 9/1969 | Myers et al. | 56/9 |
| 3,653,192 | 4/1972 | Bryant | 56/9 |
| 3,866,396 | 2/1975 | Meyer | 56/9 |
| 3,971,148 | 7/1976 | Deal | 56/9 X |
| 4,070,978 | 1/1978 | Virgilio | 56/8 X |
| 4,095,545 | 6/1978 | Vaughn et al. | 56/156 X |
| 4,196,566 | 4/1980 | Donnelley | 56/8 |
| 4,205,507 | 6/1980 | McClure | 56/8 |
| 4,248,033 | 2/1981 | Bryant | 56/6 |
| 4,416,106 | 11/1983 | Hawk | 56/8 |
| 4,520,616 | 6/1985 | Stewart et al. | 56/9 |
| 4,616,588 | 10/1986 | Caddick | 56/8 X |
| 4,638,621 | 1/1987 | Stewart, III et al. | 56/9 |
| 4,815,260 | 3/1989 | Desrosiers | 56/9 |

OTHER PUBLICATIONS

Innovative Material Systems, Inc. Versi–Dredge brochure with IMS Cutterhead data sheet (undated).

*Primary Examiner*—George A. Suchfield
*Attorney, Agent, or Firm*—Hovey, Williams, Timmons & Collins

[57] ABSTRACT

A method and apparatus for cutting aquatic vegetation is provided which substantially reduces the tendency to wrap or clog conventional cutterheads. A cutterhead of the present invention includes a plurality of radially oriented rotatable cutting members which cooperate with stationary cutting teeth to tear weeds and other aquatic vegetation. The rotatable cutting members are preferably spirally mounted along a smooth rotatable drum to inhibit draping of the vegetation during cutting. Recessed cutting teeth are located at the ends of the drum to further inhibit aquatic vegetation from passing through gaps between the drum and the cutterhead shroud. The shroud directs the cut vegetation to a submersible pump so that it may be pumped to a remote site.

18 Claims, 4 Drawing Sheets

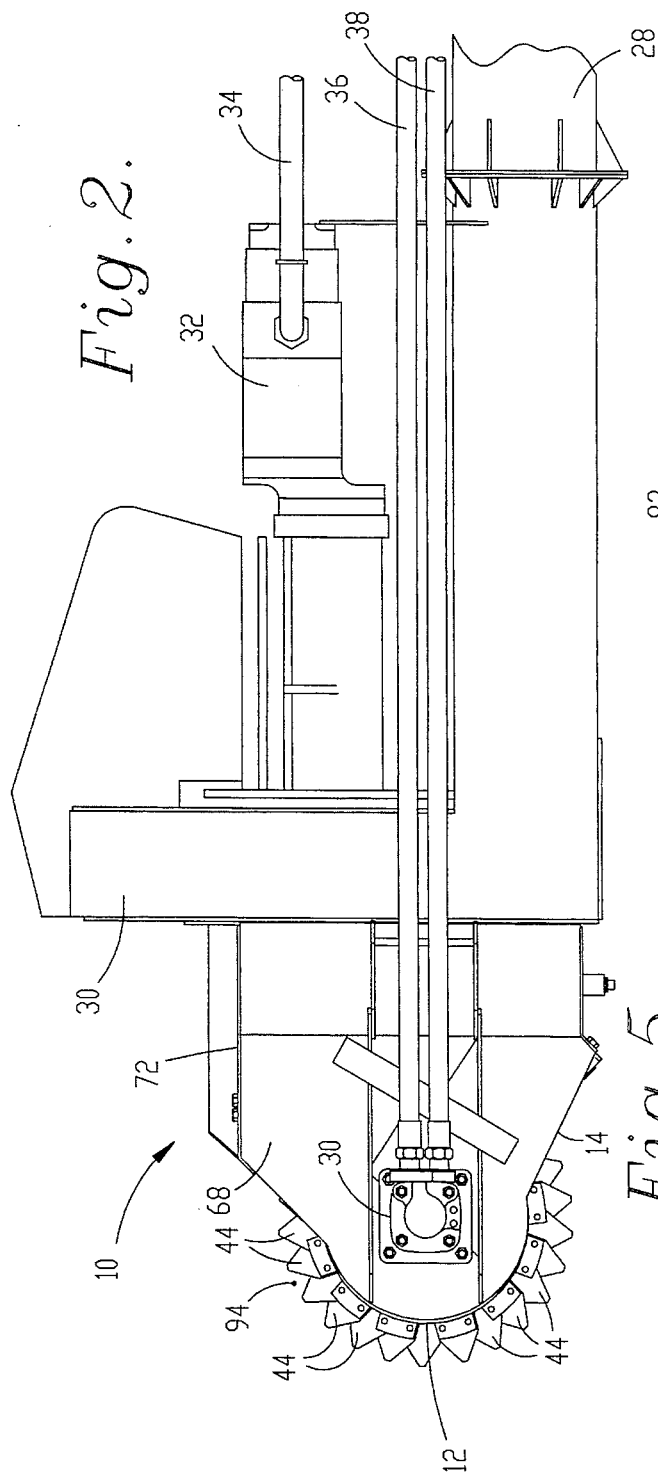
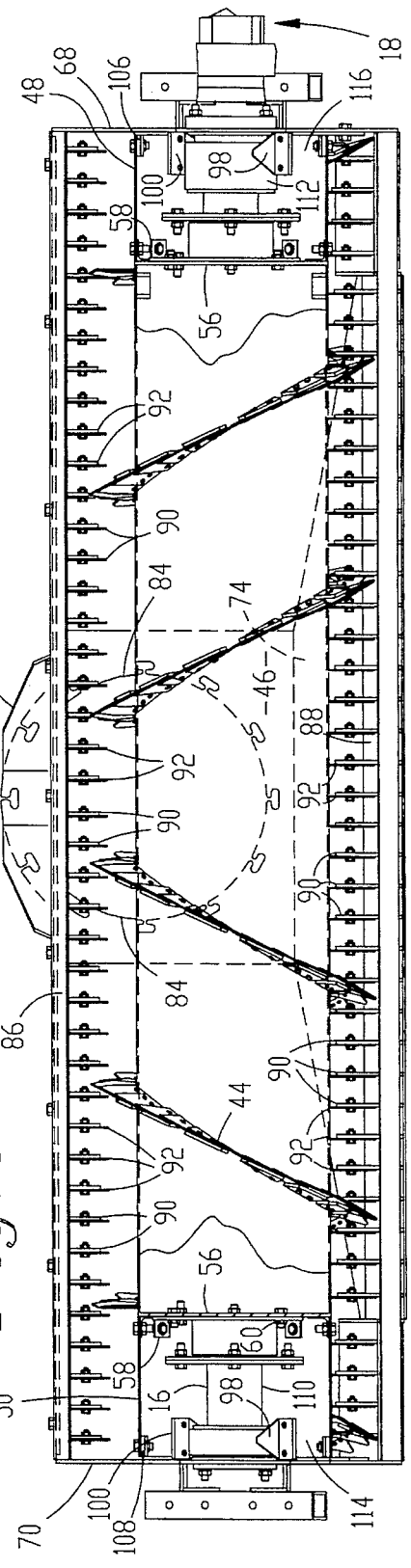

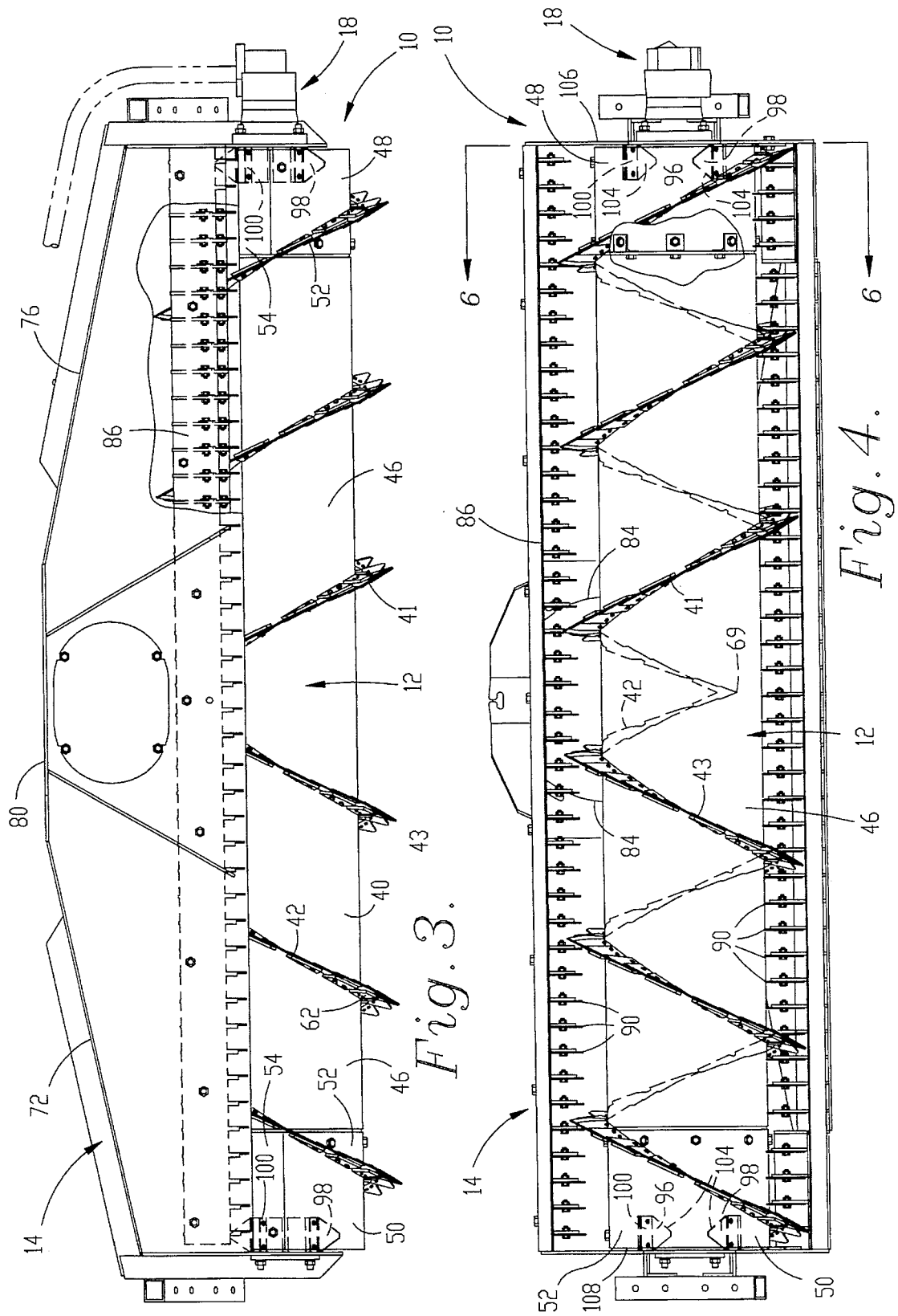

METHOD AND APPARATUS FOR CUTTING AQUATIC VEGETATION

BACKGROUND OF THE INVENTION

1. Field of the Invention

This invention broadly concerns a cutterhead and associated method for cutting weeds and other aquatic vegetation which cuts the weeds by angled teeth mounted to a rotating drum. More particularly, the cutterhead hereof provides a tearing action which also directs the cut vegetation and any sediment into a pump for removal to a remote site.

2. Description of the Prior Art

Many types of dredging operations encounter weeds or massed vegetation which has grown on sludge deposited in lagoons, in channels, or in other waters where removal is periodically required. Often the weeds or other aquatic vegetation represents an impediment to the removal of the underlying sludge, sand, silt or other deposits, because of the clogging effect of the vegetation. Cattails and plants with longs stems and gnarly roots often grow in sediment lagoons and in channels, and when the sediment is to be removed during dredging, these plants are especially tenacious and prone to cause clogging of the pumps. Moreover, they tend to wrap around many types of cutterheads typically used for clearing sediment. The entire dredging head must then be removed so that the plants can be cut away from the cutterhead. Thus, dredging in areas which have a large amount of aquatic vegetation represents one of the most difficult environs for sediment removal.

Many different types of apparatus have been used for cutting and removing aquatic vegetation. Exemplary devices of the prior art are shown in U.S. Pat. Nos. 669,820; 1,028,671; 1,795,003; 2,223,641; 2,486,275; 2,635,406; 2,702,975; 3,238,708; 3,407,577; 3,468,106; 3,653,192; 4,070,978; 4,095,545; 4,196,566; 4,205,507; 4,416,106; 4,248,033; 4,616,588; and 4,815,260. Unfortunately, none of these devices have solved the problems associated with wrapping of the plants around the cutterhead nor have they adequately worked with the pumping system to remove the cut vegetation and the sediment to be removed.

Accordingly, there has developed a need for a weed-resistant cutterhead capable of removing sediment and vegetation in plant-clogged areas.

There has also developed a real need for a cutterhead which is resistant to wrapping of long plant growth around the ends of a rotatable drum or reel.

There has also developed a need for a cutterhead which can direct the sediment and cut vegetation to an outlet port for pumping to a remote location.

SUMMARY OF THE INVENTION

These and other objects are largely met by the cutterhead and method of harvesting aquatic vegetation of the present invention. That is to say, the cutterhead of the present invention is intended to operate underwater and is more resistant to clogging than the prior art. It cooperatively removes sedimentation and cuts aquatic vegetation, and may be used in a variety of aquatic environments.

The invention hereof broadly includes a drum mounted for rotation and carrying a plurality of teeth, and a shroud which is provided with at least one cutterbar with teeth arranged in a tearing relationship with the drum mounted teeth to cut, writhe and rend vegetation which undesirably wraps around the drum or drapes across the drum teeth. The shroud is provided with a port for passing the material cut by the drum to a pump or pipe for passage to a remote site. The drum mounted teeth are preferably arrayed whereby the effectively operate not only to cut the plant material but also pass the cut vegetation along the drum in the manner of an auger during rotation. Further, the teeth are preferably oriented whereby the stationary teeth on the cutterbars pass through gaps at the points of the teeth during rotation to effect more complete cutting and a self-cleaning action.

Most preferably, the shroud for the cutterhead of the present invention is provided with upper and lower stationary cutterbars for enhanced tearing action with the rotating drum-mounted teeth to permit the stationary teeth to be suitably spaced for maintenance while providing enhanced transverse coverage to clear vegetation between the points of the drum-mounted teeth. In especially preferred embodiments, the cutterhead hereof includes teeth mounted adjacent the ends of the drum and projecting outwardly from the drum's axis of rotation to cut vegetation which may pass between the drum and the shroud and otherwise wrap around the shaft or hub rotatably carrying the drum. Because aquatic vegetation may pass through even tight tolerances, the inclusion of these outwardly projecting teeth enhances the operation of the drum by severing lengthy strings of plant material which would otherwise wrap around the shaft or hub.

During dredging operations of channels or sediment ponds, the cutterhead hereof is especially effective in dredging sediment. The cutterhead of the present invention may be directed into dense plant growth on sediment deposits and simultaneously remove the sediment and cut plant stalks and roots. The cutterhead continues to be effective in removing sediment deposits after the plant material has been cut, whereby deep deposits of sludge, mud, sand or other material may be effectively dredged to restore the channel or pond to a desired condition.

These and other advantages of the cutterhead and method of the present invention will be evident to those skilled in the art with reference to the drawings and the detailed discussion which follows.

BRIEF DESCRIPTION OF THE DRAWINGS

FIG. 2 is an enlarged fragmentary side elevational view showing the cutterhead hereof coupled to a pump and motor for passing the cut vegetation through the boom;

FIG. 3 is an enlarged top plan view of the cutterhead drum and shroud, with a portion of the shroud broken away to show an upper cutterbar and its teeth, the remainder of which is shown in phantom;

FIG. 4 is an enlarged front elevational view showing the drum and shroud, with portions one of the drum end halves removed to show the drum end mounting arrangement;

FIG. 5 is an enlarged front elevational view similar to FIG. 4 but showing the port through the shroud and portions of the drum end halves removed to show the shaft and motor for rotating the drum.

DESCRIPTION OF THE PREFERRED EMBODIMENT

Figure 1:
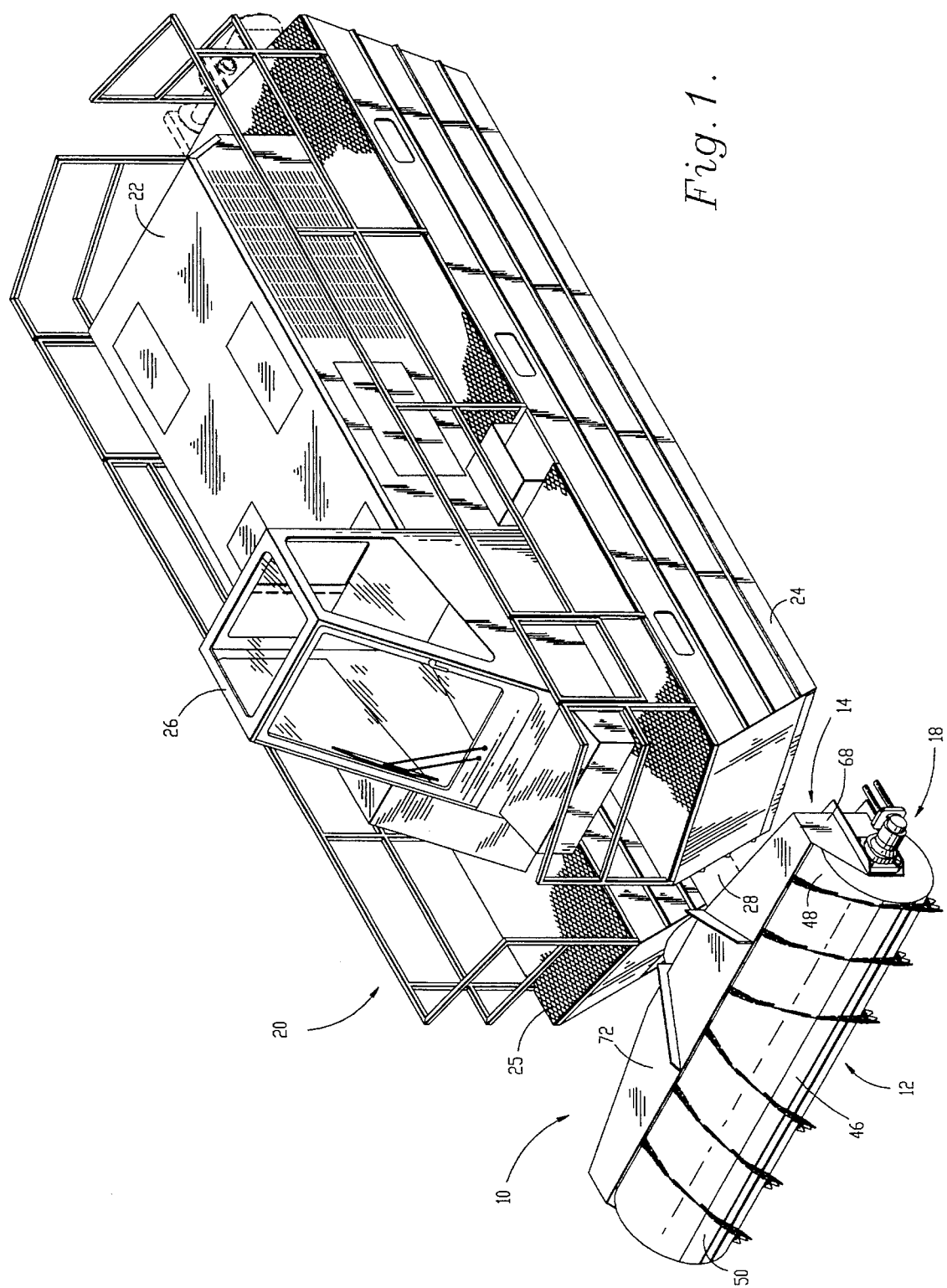
FIG. 1 is a perspective view of the cutterhead of the present invention mounted on a boom connected to a dredge.

Referring now to the drawing, a cutterhead 10 in accordance with the present invention broadly includes a rotatably mounted drum 12, a shroud 14, drum mounting structure 16 and motor 18. The cutterhead 10 is used in conjunction with a dredge 20 which includes engine compartment 22, pontoon hull 24, deck 25, cab 26, and a boom 28 pivotally mounted at the rear of the dredge. As shown in greater detail in FIG. 2, the boom 28 carries a pump 30 and pump motor 32 for operating the impeller located within the pump 30 and which receives material from the shroud 14 for delivery through the boom 28 to a remote location. The pump motor 32 and the motor 18 are both preferably hydraulically driven by hydraulic fluid under pressure by power supplied by a hydraulic pump in the engine compartment 22 and delivered through hydraulic conduits 34 (to pump motor), 36 and 38 (to motor 18).

In greater detail, the drum 12 is substantially cylindrical and presents a smooth outer surface 40 with the exception of an array 42 of spirally oriented, convergent patterned, radially projecting drum teeth 44. The drum 12 is preferably made of mild steel which provides sufficient strength and durability while the teeth 44 are hardened to cut aquatic vegetation encountered during dredging while at the same time withstanding impacts from rocks or other debris which may have settled into the sediment or other deposit to be dredged.

The drum 12 includes a center section 46 and a pair of end sections 48 and 50, each including a pair of end halves 52 and 54. The center section includes and end wall 56 at each longitudinal end and a plurality of circumferentially spaced mounting flanges 56 which project longitudinally at each end and include nuts 60 welded thereto for receiving bolts which project through the surfaces of the end halves 52 and 54 and are threaded into the nuts. This enables easy removal of the end halves 52 and 54 for access to the drum mounting structure 16. As may be seen from FIGS. 3 and 4, the array 42 extends through the end sections 48 and 50 whereby the spiral orientation of the array 42 is continuous from the ends of the drum 12 across the ends sections 48 and 50 and into the center section 46.

Figure 6:
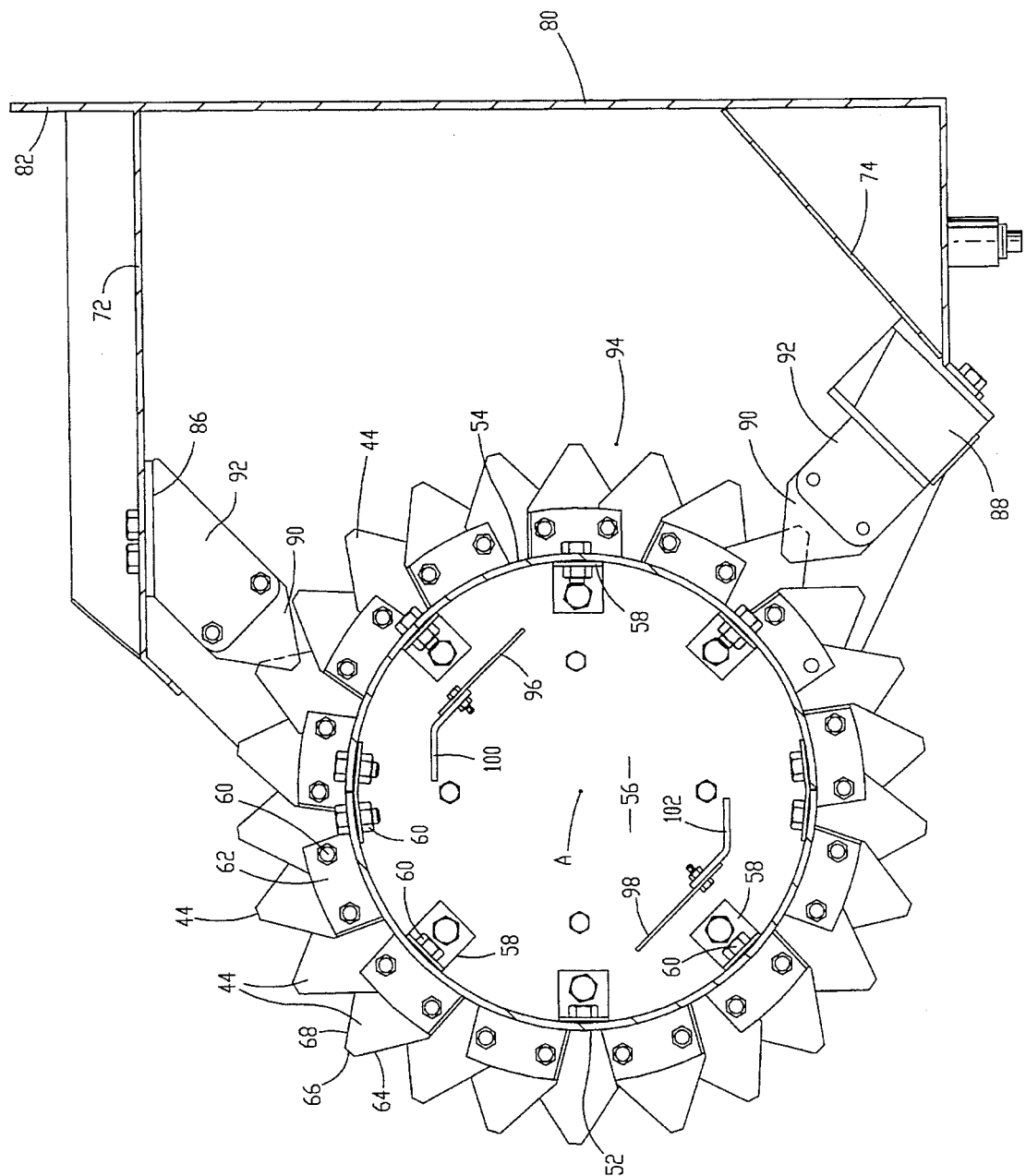
FIG. 6 is an enlarged vertical cross-sectional view taken through line 6—6 of FIG. 4, showing the mounting relationship of the teeth on the drum, the upper and lower cutterbars, and adjacent the ends of the drum.

The array 42 includes two convergent helically oriented flights 41 and 43 of mounting plates 62 which are welded to the drum surface 40. The mounting plates 62 are spirally arrayed as shown in FIG. 4 to provide a toothed cutting surface across virtually the entire width of the drum 12 when teeth 44 are mounted to the plates 62. Each tooth 44 is mounted by two bolts into nuts 60 positioned on the opposite sides of the plates 62, so that every other tooth 44 spans two plates 62, as best seen in FIG. 6. Each tooth 44 presents leading cutting edge 64, a tip 66, and a trailing cutting edge 68, although the motor 18 is preferably a reversible hydraulic motor which permits clearing of the teeth by backwards rotation when necessary. In normal rotation of the teeth, the array 42 converges to an apex 69 to effectively auger the cut and dredged material toward the center of the drum 12.

The shroud 14 includes a pair of opposed end panels 68 and 70 for supporting drum mounting structure 16, upper and lower walls 72 and 74 respectively, angled walls 76 and 78 and back wall 80, all preferably of steel plate. The back wall 80 presents a facing 82 which extends normally above the upper wall 72. A port 84 is centrally located in the back wall and presents a plurality of surrounding holes to facilitate mounting to the pump 30.

Stationary cutterbars 86 and 68 are mounted to the upper and lower walls 72 and 74 respectively. Each cutter bar 86 and 88 presents a plurality of cutterbar teeth 90 which are configured substantially the same as 44 and mount to upstanding flanges 92 on each stationary cutterbar by bolts threaded onto nuts on the other side of the flanges. The spacing of the flanges 92 of each cutterbar 86 and 88, and therefore the teeth 90 carried thereby, is staggered whereby the teeth 90 on cutterbar 86 are not vertically aligned with the corresponding teeth 90 on cutterbar 88. However, the alignment of the teeth 90 corresponds to gaps 94 between the teeth 44 on the drum 12, whereby the slight transverse space between the teeth 44 receives the substantially fore and aft aligned teeth 90 of the stationary cutterbars with the distance between the drum teeth 44 and the cutterbar teeth 90 being about ½" at the closest point of approach to yield good cleaning and tearing action during rotation. In order to facilitate access to the teeth 90 for maintenance by providing adequate spacing therebetween, not every gap 94 receives a tooth 90 therebetween, but in the preferred embodiment shown, approximately two out of every three gaps 94 will receive a tooth 90 therebetween to provide a tearing relationship between the teeth 90 and the teeth 44 for cutting, writhing and rending any vegetation which wraps around the drum or drapes across the teeth 44 or teeth 90.

The shroud 14 additionally mounts guard teeth 96 and 98 which are bolted to ear plates 100 and 102 respectively at each end panel 68 and 70 respectively. The guard teeth 96 and 98, as seen in FIG. 6, present cutting edges 104 which are pointed outwardly relative to the axis of rotation A of the drum 12 and are positioned radially outside the drum mounting structure 16 but radially interior to the end sections 48 and 60. The guard teeth 96 and 98 are located proximate the end panels of the shroud to cut vegetation which passes through the space defined between the longitudinal margins 106 and 108 of the drum and the end panels 68 and 70 respectively of the shroud 14 before such vegetation passes longitudinally toward to the center of the drum and wraps around the drum mounting structure 16.

The drum mounting structure 16 is largely conventional and includes hub 110 which permits rotation between the shroud 14 and the drum 12. The hub 110 is bolted to the end panel 70 and to the end wall 56 at one end of the center section of the drum 12. Another hub 112 rigidly connects the motor 18 and the center section 46, and is bolted to the end wall 56 and the motor 18. In turn, the motor 18 is rigidly bolted to the end panel 68 and is preferably a reversible hydraulic motor which enables reversing of the drum 12 to clear any rocks, stumps or other large objects stuck between teeth 44 or teeth 90. The motor 18 is driven by hydraulic fluid supplied under pressure and delivered through conduits 36 and 38. Hubs 110 and 112, as well as guard teeth 96 and 98 are located in open-ended cavities 114 and 116 positioned outboard of end walls 56 and radially interior to end sections 48 and 50.

In preparation for use of the cutterhead 10, the shroud 14 is bolted to the pump 30, the conduits 36 and 38 connected to the hydraulic pump in the engine housing, and the boom is lowered by the operator in the cab to begin dredging. Any aquatic vegetation encountered during dredging is severed and cut by the cutting action of the teeth 44 while the drum 12 rotates, and further enhanced by the tearing action between the teeth 90 mounted on the stationary cutterbars when teeth 44 pass thereby. The teeth 44 present a cutting surface which extends transversely across the entire length of the drum 12, and thus any vegetation passing across the path of the drum 12 will be engaged by a tooth 44. As noted, except for the teeth 44, the drum 12 presents a substantially smooth surface which inhibits the ability of any vegetation to cling to the drum and become draped across it, thereby accumulating and fouling the cutterhead 10.

The array 42 of teeth 44 acts further as an auger to move any dredged sediment and cut vegetation to the center of the drum 12 and thus immediately proximate the port 84 for passage into the pump 30. The cutterhead 10 chops the vegetation into small enough pieces to avoid jamming the pump, and thus the cut vegetation and the sediment or other deposits can be effectively dredged. Many types of aquatic vegetation including floating plants like hyacinth, submerged vegetation such as milfoil and hydrilla, and emergent vegetation such as cattail and small willows can be cut and removed using the cutterhead 10 hereof. As in conventional dredging practice, the boom 28 is raised or lowered by a winch mounted on the dredge to engage the vegetation and sediment or other deposits to the desired depth, and the dredge may be self-powered or positioned by shore-anchored cables to direct the cutterhead 10 laterally into position.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state his intent to rely on the Doctrine of Equivalents to determine and assess the reasonably fair scope of their invention as pertains to any apparatus not materially departing from but outside the liberal scope of the invention as set out in the following claims.

We claim:

1. Apparatus for cutting aquatic vegetation comprising:
   a first stationary cutterbar presenting a first set of spaced-apart cutterbar teeth mounted therealong;
   a second stationary cutterbar presenting a second set of spaced-apart cutterbar teeth mounted therealong;
   a cutterhead shroud mounting said first and second stationary cutterbars;
   a drum rotatably mounted proximate said cutterhead shroud, said drum presenting a substantially smooth drum surface and presenting a plurality of radially projecting drum teeth therealong;
   means rotatably mounting said drum proximate said cutterheads and
   means mounting said drum teeth to present gaps between the points thereof whereby some of said drum teeth pass closely adjacent said first set of teeth in tearing relationship and other of said drum teeth pass closely adjacent said second set of teeth in tearing relationship during rotation of said drum.

2. An apparatus as set forth in claim 1 wherein at least some of said drum teeth are oriented obliquely to a plane normal to the axis of rotation of said drum.

3. An apparatus as set forth in claim 2, wherein at least some of said cutterbar teeth are oriented in spaced relationship in alignment with the plane normal to the axis of rotation of said drum.

4. An apparatus as set forth in claim 1 wherein said drum teeth are oriented in a helically oriented array across at least a part of said drum.

5. An apparatus as set forth in claim 1 wherein said drum teeth are positioned in an array extending substantially the longitudinal length of said drum to present a substantially continuous cutting edge extending along the longitudinal length of said drum.

6. An apparatus as set forth in claim 5 wherein each of said drum teeth are positioned in overlapping relationship to the drum tooth adjacent thereto.

7. An apparatus as set forth in claim 1 wherein said drum teeth are coupled to said drum by threaded fasteners.

8. An apparatus as set forth in claim 1, wherein said drum is substantially cylindrical and presents longitudinally spaced ends having open-ended cavities radially interior to said drum surface at each end of said drum.

9. An apparatus as set forth in claim 8, including at least one radially outwardly projecting tooth positioned in each of said cavities for cutting vegetation passing between said shroud and said drum ends.

10. Apparatus for cutting aquatic vegetation comprising:
    a cutterhead shroud presenting an port for passing cut vegetation therethrough;
    a drum;
    means mounting said drum for rotation relative to said shroud;
    a motor for rotating said drum; and
    an array of drum teeth projecting radially from said drum, said array being of a substantially helical configuration about said drum for promoting movement of the cut vegetation to said port during rotation of said drum.

11. Apparatus as set forth in claim 10, wherein said shroud presents two opposed end panels, said port being located substantially equidistant between said end panels.

12. Apparatus as set forth in claim 11, wherein said array comprises two substantially helical and convergent flights of drum teeth.

13. Apparatus as set forth in claim 10, including threaded fasteners for removably attaching said drum teeth to said drum.

14. An apparatus as set forth in claim 10 wherein said array extends substantially the longitudinal length of said drum to present a substantially continuous cutting edge extending along the longitudinal length of said drum.

15. An apparatus as set forth in claim 14 wherein each of said drum teeth are positioned in overlapping relationship to the drum tooth adjacent thereto.

16. An apparatus as set forth in claim 10, wherein said drum is substantially cylindrical and presents longitudinally spaced ends having open-ended cavities radially interior to said drum surface at each end of said drum.

17. An apparatus as set forth in claim 16, including at least one radially outwardly projecting tooth positioned in each of said cavities for cutting vegetation passing between said shroud and said drum ends.

18. A method of cutting aquatic vegetation comprising the steps of:
    providing a dredge including a pump and means for conveying cut vegetation from said pump, said pump mounting a cutterhead having a shroud and a drum, said drum presenting a substantially helical array of drum teeth, said shroud present at least one stationary cutterbar presenting a plurality of cutterbar teeth, at least some of said cutterbar teeth being oriented in vegetation tearing relationship to said drum when said drum is rotated relative to said shroud, said shroud further including a port for passing cut vegetation to said pump;

placing said cutterhead in engagement with aquatic vegetation;

rotating said drum to cut said vegetation;

moving said vegetation transversely along said drum by augering action of said helical array of teeth; and passing said vegetation through said port and into said pump.

* * * * *